United States Patent [19]

Petry

[11] 4,097,080
[45] Jun. 27, 1978

[54] TELESCOPING ENERGY ABSORBER WITH ANTI-ROTATIONAL INTERLOCK FOR VEHICLE BUMPERS

[75] Inventor: Ronald G. Petry, Xenia, Ohio

[73] Assignee: General Motors Corporation, Detroit, Mich.

[21] Appl. No.: 781,551

[22] Filed: Mar. 28, 1977

[51] Int. Cl.² .......................................... B60R 19/06
[52] U.S. Cl. ...................................... 293/85; 293/70
[58] Field of Search ................. 293/1, 60, 70, 71 R, 293/73, 84, 85, 89, DIG. 2; 267/116, 139, 140; 213/43, 223

[56] References Cited

U.S. PATENT DOCUMENTS

| 1,702,675 | 2/1929 | Ventura | 293/70 |
| 3,715,114 | 2/1973 | Thorsby et al. | 267/140 |
| 3,718,326 | 2/1973 | Ristau | 293/85 |
| 3,794,310 | 2/1974 | Mewhinney | 293/70 |
| 3,820,772 | 6/1974 | Kerr et al. | 293/73 |

Primary Examiner—Trygve M. Blix
Assistant Examiner—Stuart M. Goldstein
Attorney, Agent, or Firm—Charles R. White

[57] ABSTRACT

A pair of telescopic energy absorbers is employed to mount a laterally extending bumper to the side rails of a vehicle frame. A mechanical interlock prevents relative rotation of the components of the energy absorbers so that the side rails are rigidly coupled by the bumper to increase their structural strength and to reduce vehicle shake.

3 Claims, 4 Drawing Figures

TELESCOPING ENERGY ABSORBER WITH ANTI-ROTATIONAL INTERLOCK FOR VEHICLE BUMPERS

This invention relates to energy absorbers for vehicle bumpers and more particularly to a new and improved telescoping energy absorber for mounting a rigid bumper to a vehicle frame that incorporates an anti-rotational interlock and stop of telescoping energy absorber components to increase the torsional stiffness of the vehicle frame.

Prior to the present invention, a wide variety of energy absorber units have been utilized to mount a rigid transversely extending bumper to the frame of a vehicle for absorbing impact energy. Some of these units comprise telescoping inner and outer cylinders which are movable from an extended position to a telescoped and collapsed position on bumper impact of predetermined magnitude. These energy absorber units have employed various energy absorber mediums to dissipate the energy of such impacts. For example, viscous fluids, spring devices and stretchable bands have been utilized as energy absorbers. While these energy absorber devices have adequately performed to absorb impact energy, they generally added little torsional stiffness or rigidity to the vehicle frame since their full structural potential was not realized. To remedy this, the present invention is drawn to a special energy absorbing unit comprising inner and outer telescoping cylinders improved by special spring-loaded interlock and stop construction to rigidly couple the two cylinders to each other in their extended position to prevent their relative rotation. This construction permits a pair of cylindrical energy absorber units to structurally interconnect the two side rails of a vehicle frame through the bumper to increase torsional stiffness of the vehicle frame so that vehicle shake is reduced or eliminated. With this construction the side rails will be interconnected so that the cross member of the vehicle frame adjacent the bumper can be made of lighter weight material having reduced strength or be entirely eliminated. This importantly provides for reduced vehicle weight and for more fuel efficient vehicles.

It is a feature, object and advantage of this invention to provide a new and improved telescoping energy absorber mounting a vehicle bumper to the side rails of a vehicle frame to increase their torsional rigidity.

It is another feature, object and advantage of this invention to provide a new and improved locking device to prevent a piston tube from turning with respect to a cylinder tube of a telescopic energy absorber to add torsional stiffness to a vehicle to thereby reduce vehicle shake or other vibrations from irregular roadways.

It is a feature, object and advantage of this invention to provide a new and improved telescoping energy absorber mounting a bumper beam to the side rails of a vehicle frame with the energy absorber having telescopically mounted inner and outer cylinders spring biased to an extended position with relative rotation eliminated by the meshing of teeth of a pair of locking stop rings carried by the cylinders.

It is a feature, object and advantage of this invention to provide a new and improved energy absorbing system for a vehicle having a pair of longitudinally extending side rails interconnected by telescoping energy absorber units mounted to the side rails and a laterally extending bumper beam. In the extended position the inner and outer cylinders of each unit are connected by stop rings having intermeshing teeth that prevent relative rotation of the cylinders so that the side rails are rigidly interconnected. On bumper impact the energy absorbers telescope to release the engaging teeth.

These and other features, objects and advantages of this invention will become more apparent from the following detailed description and drawing wherein.

Figure 1:
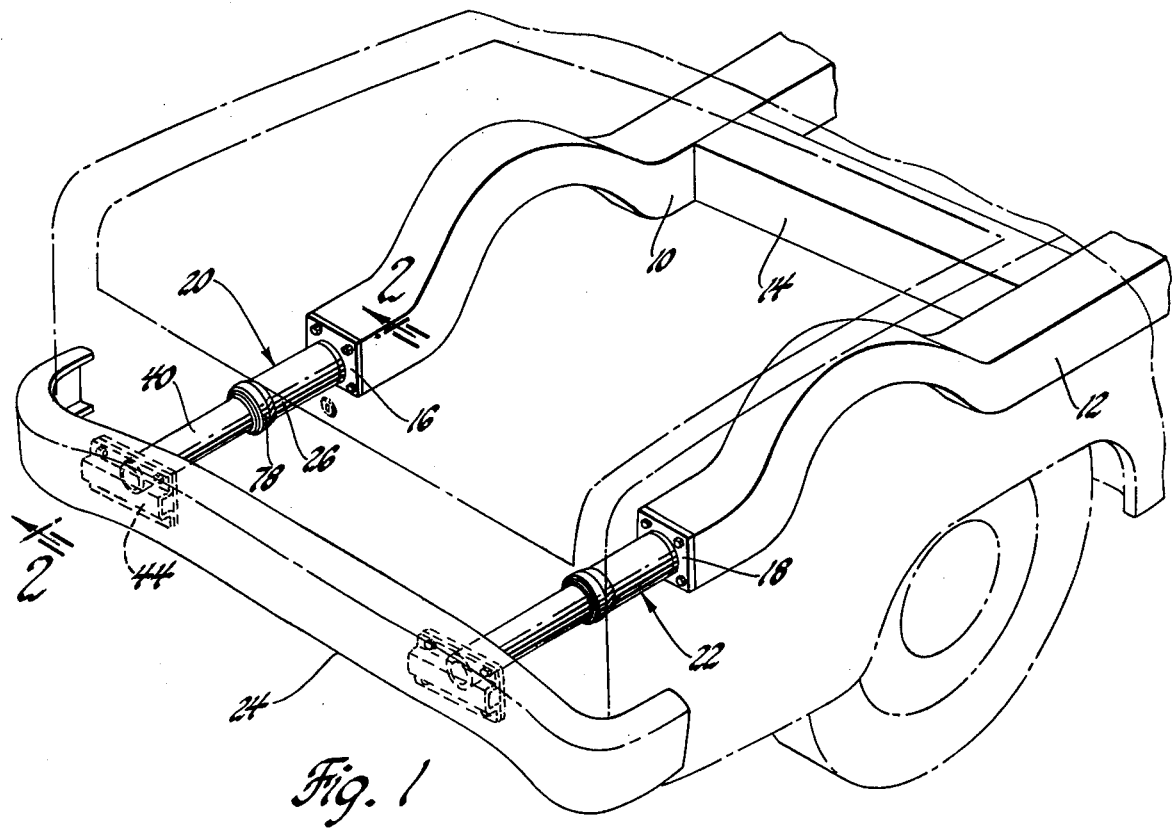
FIG. 1 is a perspective view of an automobile vehicle chassis frame incorporating energy absorbing units according to this invention mounting a bumper assembly to the side rails of the frame.

Referring now particularly to FIG. 1 of the drawing, there is shown a rear portion of a chassis frame of an automobile vehicle that includes a laterally spaced pair of longitudinally extending side rails 10-12 which may optionally be interconnected with a cross member 14. Bolted or otherwise secured to the ends of each of the side rails are the mounting plates 16, 18 supporting left and right side telescopic energy absorbing units 20, 22 that in turn mount the rigid laterally extending bumper assembly 24 to the frame. The energy absorber units have the same construction so that only one of the energy absorbing units is described in detail.

The energy absorbing unit 20 comprises an outer cylinder 26 closed by an end cap 28 which has a threaded stud 30 welded or otherwise seamed thereto. Stud 30 extends through central opening 32 in the mounting plate 16. Nut 34 threaded on the stud secures the outer cylinder to the plate 16 which is in turn removably secured to the end of the side rail by nut and bolt means 36. In addition to the outer cylinder 26 each energy absorbing unit comprises an inner cylinder 40 which is mounted for limited telescoping movement within the outer cylinder and which projects axially therefrom. The outermost end of the inner cylinder 40 is closed by a base plate 42 which is adapted to be secured to a bumper bracket 44 by bolt and nut means 46. The bumper bracket 44 is secured to the bumper assembly 24 by weld 48 or by any other suitable fastener means. The inner end of the inner cylinder 40 has a cap 50 secured thereto which defines the rear end intermediate fluid chambers 52 and 54, each filled with a suitable hydraulic fluid such as oil. A bearing sleeve 58 of a suitable material such as glass-filled Nylon is mounted over the cylinder cap 50 to slidably fit the inner diameter of the outer cylinder 26. There is, however, sufficient clearance between the bearing sleeve 58 and the inner wall of the outer cylinder 26 so that chamber 54 is in direct hydraulic communication with a cylinder inner space 60 formed between the outer and inner cylinders.

Disposed within inner cylinder 40 is a floating cup-shaped sheet metal piston 62 fitted with an O-ring 64 that separates intermediate chamber 54 from a third chamber 66 formed between the floating piston 62 and base plate 42. A quantity of gas is compressed within chamber 66 being injected through an orifice 68 formed in the base plate, which is subsequently sealed by a ball welded therein. The force of the gas compressed within chamber 66, acting through piston 62 and the oil in chambers 52 and 54 urges the cylinders 26 and 40 to the normally extended position shown in FIG. 2. An orifice element 70 is adjustably fitted in an aperture 72 in the cylinder cap 50 and receives the end portion of a metering rod 74 that extends axially from end cap 28 into the cylinders. The rod 74 is formed with equally spaced flats 75 disposed at a preselected angle with respect to the rod center line over the length of the latter to exhibit varying depths relative to the cylindrical dimensions of the rod. The rod is sized to the diameter of the orifice element 70 so that the orifice element is guided by the curved portions of the rod when the energy absorbing unit strokes. The flats of the metering rod provide for a gradually decreasing orifice area between the rod and the edge of the orifice when the inner cylinder is stroked by impact forces directed to the bumper assembly so that a constant pressure in contracting chamber 52 is maintained as fluid is metered into expanding intermediate chamber 54. When this occurs, floating piston 62 moves inwardly to further compress the gas in chamber 66 which forms the return spring of this unit.

Figure 2:
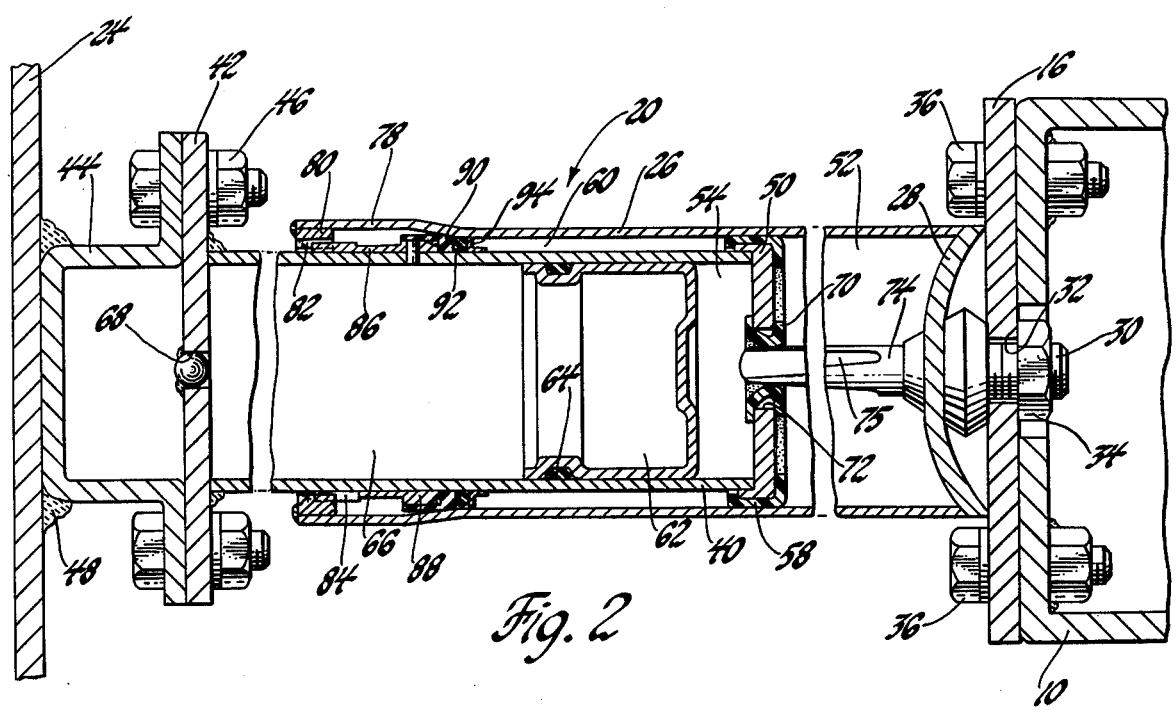
FIG. 2 is an enlarged sectional view taken generally along the line 2—2 of FIG. 1 showing an energy absorbing unit of this invention in its normal extended position.

As shown best in FIG. 2, the end of the outer cylinder 26 is radially bulged at 78 and is provided with a first annular locking ring 80 welded therein. This locking ring is formed with axially projecting teeth 82 which are adapted to closely mesh with corresponding axially projecting teeth 84 of a second annular locking ring 86 welded or otherwise secured to the inner cylinder 40. When the cylinders are urged by the gas spring to the extended position the teeth of the two locking rings mesh to prevent relative rotation of the inner and outer cylinders and to establish a stop for their axially extended position. The locking ring 86 may be formed as part of a bearing and stabilizing sleeve 88 that is fixed to and extends around the inner cylinder 40. Disposed adjacent to the headed inner end of bearing and stabilizer sleeve 88 is elastomeric drag sleeve 90 and an O-ring seal 92 that is held in position against the end of the drag sleeve by an annular retainer 94.

Figure 3:
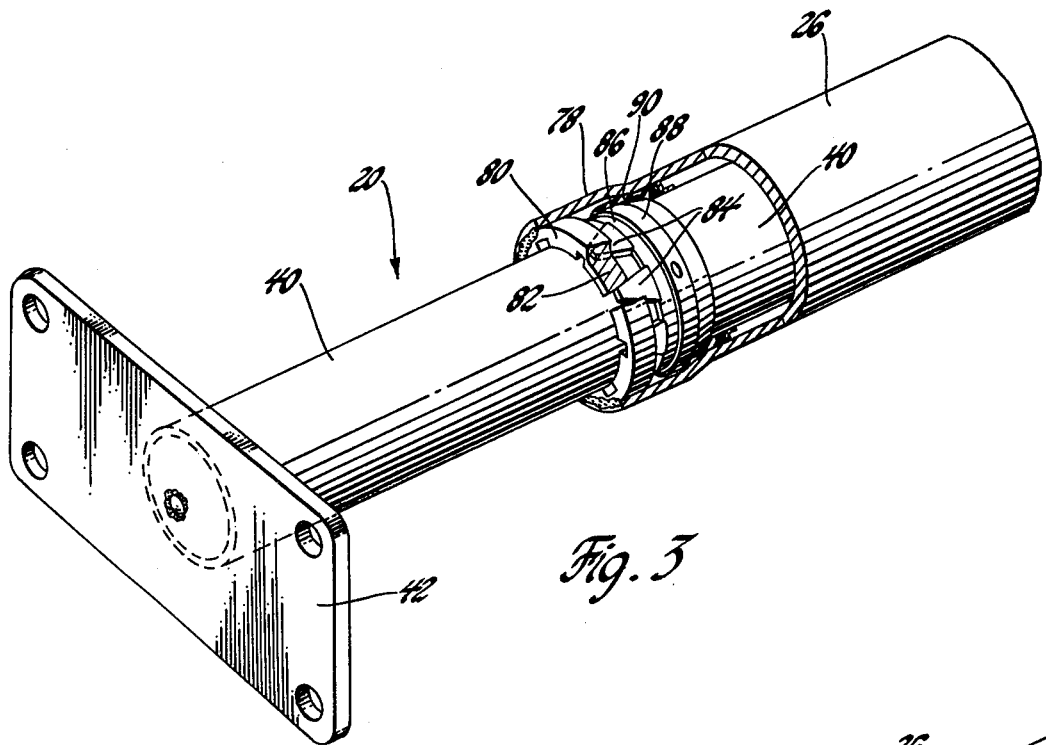
FIG. 3 is a perspective view showing an energy absorbing unit of this invention in a normal extended position.
Figure 4:
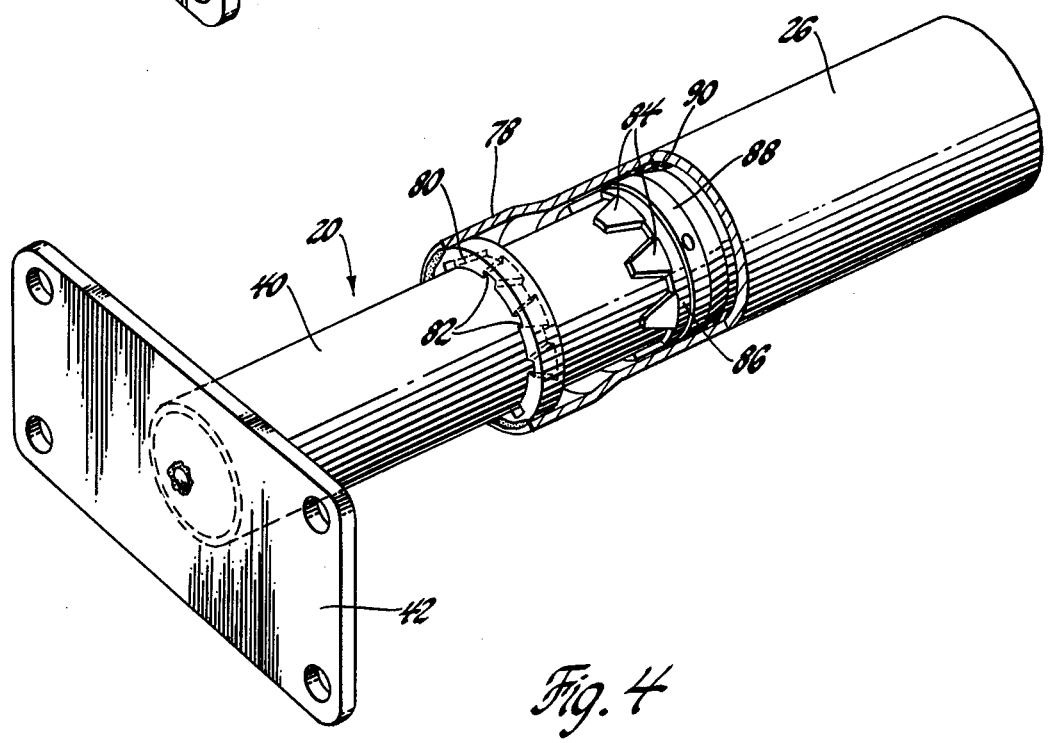
FIG. 4 is a view similar to FIG. 3 showing the energy absorbing unit of FIG. 3 stroking from an extended position toward a telescoped position with the interlock mechanism of this invention being disconnected in response to impact of the bumper beam.

In the extended position it will be seen from FIG. 3 that the toothed portions of the locking rings are biased into multiple and close engagement by the forces of the gas return spring. This effectively prevents any relative rotation between the inner and outer tubular members. With this locking, the side rails of the vehicle frame are rigidly secured together so that the cross rail 14 can be eliminated or reduced substantially in weight, strength and size. With this construction torsional stiffness of the frame is increased and any tendency of the side rails to walk or oscillate as the vehicle is driven is effectively reduced. With the cross rail eliminated or reduced in weight, overall dead weight is reduced so that vehicle operating economy is improved.

Above predetermined bumper impact loads, it will be appreciated that the inner cylinders of units 20, 22 will readily telescope within the outer cylinders. The rearward axial movement of the inner cylinders will effect disengagement of the teeth of the stop rings. When this occurs, the oil flow between the chambers through the orifices provides for impact energy absorption as explained in the prior art U.S. Pat. No. 3,700,273 to George W. Jackson et al whose disclosure is hereby incorporated into this specification.

On removal of the impact load, the gas spring will return the units and the bumper assembly to their original position with the teeth of the stop rings closely engaging to again prevent any relative rotation of the cylinders and to couple the side rails to each other.

While a preferred embodiment of this invention has been shown and described to illustrate operating principles thereof, other embodiments will become apparent to those skilled in the art. Accordingly, this invention is set forth in the following claims.

I claim:

1. An energy absorbing system for a vehicle comprising a vehicle frame having left and right longitudinally extending side rails, a pair of telescoping energy absorber units for said side rails, each of said energy absorber units comprising a first tubular part secured to an associated side rail and a second tubular part telescopically mounted with respect to said first tubular part and projecting longitudinally outwardly beyond one end of said associated side rail, a substantially rigid and laterally extending bumper beam spanning one end of said side rails and operatively connected to said second tubular part of each of said energy absorber units to thereby interconnect said side rails, said first tubular part having a plurality of axially projecting teeth, said second tubular part has a plurality of axially projecting teeth secured thereto adapted to mesh with the axially projecting teeth of said first part, yieldable means urging said tubular parts to an extended position with respect to each other whereby said axially projecting teeth of said first part engage the axially projecting teeth of said second part to lock said tubular parts against relative rotation to thereby minimize independent oscillatory movement of said side rails and increase the torsional rigidity of said frame until said teeth of said first and second parts are disengaged by the telescopic collapsing movement of said tubular parts with respect to each other in response to impact of said bumper beam causing said bumper beam to move toward said side rails.

2. An energy absorbing system for a vehicle comprising a vehicle frame having left and right longitudinally extending side rails, a pair of telescoping energy absorber units for said side rails, each of said energy absorber units comprising a first tubular part secured to an associated side rail and a second tubular part telescopically mounted with respect to said first tubular part and projecting longitudinally outwardly beyond one end of said associated side rail, a substantially rigid and laterally extending bumper beam spanning said side rails and operatively connected to said second tubular part of each of said energy absorber units to thereby interconnect said side rails, and stop ring means attached to said tubular parts of each unit and operatively disposed between said first and second tubular parts adjacent opposed sides thereof, said stop ring means having axially projecting teeth means intermeshing to lock said tubular parts against relative rotation to thereby minimize independent oscillatory movement of said side rails and increase the torsional rigidity of said frame until said parts are collapsed and inwardly telescoped with respect to each other on impact of said bumper beam and spring means to bias said tubular parts to an extended position established by the meshing engagement of said teeth means of said stop ring means.

3. An energy absorbing system for a vehicle comprising a vehicle frame having left and right longitudinally extending side rails, a pair of telescoping energy absorber units for said side rails, each of said energy absorber units comprising a first tubular part secured to an associated side rail and a second tubular part telescopically mounted with respect to said first tubular part and projecting longitudinally outwardly beyond one end of said associated side rail, a substantially rigid and laterally extending bumper beam spanning said side rails and operatively connected to said second tubular part of each of said energy absorber units to thereby interconnect said side rails, and a pair of stop ring means attached to said tubular parts of each of said units adjacent opposed ends thereof, said stop ring means of one part of each unit having an annular series of axially projecting teeth means that intermesh with an annular series of axially projecting teeth of the other part of each respective unit to lock said tubular parts against relative rotation to increase the torsional rigidity of said frame to thereby minimize independent oscillatory movement of said side rails until said parts are telescoped inwardly with respect to each other on impact of said bumper beam and spring means to bias said tubular parts to an extended position established by the meshing engagement of said teeth means of said stop ring means of said units.

* * * * *